United States Patent [19]

Becker

[11] 4,308,224

[45] Dec. 29, 1981

[54] REPRODUCTION PROCESS FOR OIL PAINTINGS

[76] Inventor: Heinz W. Becker, Martin-Greif-Str. 3, 8000 München 2, Fed. Rep. of Germany

[21] Appl. No.: 98,716

[22] Filed: Nov. 30, 1979

[30] Foreign Application Priority Data

Nov. 30, 1978 [DE] Fed. Rep. of Germany ....... 2851875

[51] Int. Cl.[3] ......................... B29C 17/00; B29G 5/00

[52] U.S. Cl. ......................................... 264/25; 264/26; 264/220; 264/247; 264/257; 264/320; 264/324

[58] Field of Search ................... 264/22, 25, 132, 135, 264/246, 247, 257, 220, 293, 322, 320, 324, 26

[56] References Cited

U.S. PATENT DOCUMENTS

| | | | |
|---|---|---|---|
| 2,699,113 | 1/1955 | Hoover | 264/25 |
| 2,825,282 | 3/1958 | Gergen et al. | 264/25 |
| 2,886,828 | 5/1959 | Lattuca | 264/322 |
| 3,058,165 | 10/1962 | Purvis | 264/257 |
| 3,060,611 | 10/1962 | D'Andrea | 264/132 |
| 3,077,040 | 2/1963 | Stieber et al. | 264/322 |
| 3,674,591 | 7/1972 | Boyd | 264/22 |
| 3,991,145 | 11/1976 | Landsman | 264/25 |
| 4,170,618 | 10/1979 | Adams | 264/132 |

FOREIGN PATENT DOCUMENTS

| | | | |
|---|---|---|---|
| 1493516 | 5/1966 | France | 264/22 |
| 1548337 | 7/1967 | France | 264/22 |

*Primary Examiner*—James B. Lowe

*Attorney, Agent, or Firm*—Oblon, Fisher, Spivak, McClelland & Maier

[57] ABSTRACT

A process for the reproduction of oil painting and the like, having a relief surface, using a relief mold taken from the original and a thermoplastic foil, imprinted with a color picture corresponding to the original, the foil being molded while being heated and which includes placing the foil upon the relief mold in a fitting alignment and heating the foil essentially homogeneously to its liquefying temperature across its entire surface.

10 Claims, 2 Drawing Figures

REPRODUCTION PROCESS FOR OIL PAINTINGS

BACKGROUND OF THE INVENTION

1. Field of the Invention

The invention relates to a process for the reproduction of oil paintings and the like with a relief surface, using a relief mold taken from the original and a thermoplastic foil imprinted with the color picture representing the original, which is formed while being heated.

2. Description of the Prior Art

In order to reproduce, for instance, an oil painting, such may be copied. Good copies, however, demand such a high degree of skill and so much time that they are very expensive and cannot be produced to meet increased demands and increasing living standards. While artistic polychrome prints permit very high fidelity in color and shading and are inexpensive, they include the disadvantage of lacking the relief dimensions of the original, which in an oil painting or a similar artistic art object is also a means of expression of the artist and is recognized as such by the layman.

As a solution of this problem DEPS No. 494, 894; FR-PS No. 15 21 466; DE-AS No. 20 19 699 and DE-OS No. 2 352 966 disclose processes by means of which a transparent layer of gelatine or plastic, respectively, is applied to a polychrome print of the original which, by means of a mold taken from the original is given the relief texture of the surface either before or after its application to the picture surface. In this manner, the transparent surface mimicks the relief character of the surface structure, but still does not have the same effect as the original, since the surface structure is not created by the color so that the effect of this surface structure very highly depends on the viewing angle, the lighting and similar influences.

These inadequacies are prevented when using the process as described in the category of processes of the present invention or as described in FR-PS No. 14 93 516, as well as in FR-PS No. 15 48 337. According to FR-PS No. 14 93 516 the relief mold is supplied with openings for air passage. Then, the printed foil is superimposed on the relief mold in a fitting alignment, and a thick polystyrene foil is applied. The polystyrene foil is then heated to the softening temperature of the printed foil. Then, by means of a partial vacuum beneath the relief mold and/or excess pressure above the polystyrene foil, the latter is pressed into the indentations of the relief mold together with the printed foil. In this manner, after hardening, the printed foil has the surface structure of the original.

The process according to FR-PS No. 15 48 337 is identical to the process just described with the exception that the printed foil is heated by means of infra-red radiation instead of contact heating by means of a polystyrene foil and that molding takes place exclusively by a partial vacuum beneath the relief mold. This represents an improvement over the above mentioned transparent relief surface layers. Inasmuch, however, as with both of these processes considerable pressure forces act upon the foil during the molding, such force being listed as 7 kg/cm$^2$ for the first described process, it follows that the foil must necessarily have a certain thickness. As a consequence, delicate relief structures may not be reproduced with great fidelity. While this may not be very important for some types of originals, the delicate technique of mannerism, especially of the Munich school, will result in marked differences from the original.

SUMMARY OF THE INVENTION

An object of the invention is thus to solve the task of providing an oil painting reproduction process resulting in reasonably priced reproductions of highest fidelity to the original.

In accordance with the present invention, by the homogeneous heating of the printed foil through its entire thickness of its body, respectively, to the liquefying temperature, the foil melts down into the recesses of the relief mold. Because in this melting process, the foil is essentially molded by its own weight, and no strong forces must be applied to it, particularly in its liquefying state, such foil can be very thin, so that hardly visibly surface structures can be faithfully reproduced. It is an added advantage of the use of such a very thin foil that very little heat is needed and the colors used are exposed to heat for a much shorter time span, reducing the danger that the colors might be falsified. Such also improves the speed of the process since the times for heating and cooling are much shorter. It is an added advantage of the process of the invention that the relief mold used can be made with the greatest ease. Only in very rare cases could it become necessary to provide microscopically small openings to let trapped air escape from under the melting foil.

A particular advantage of the present invention resides in the fact that simultaneously with the shaping of the foil, a supporting layer is applied to the reverse side of the foil. Preferably, the supporting layer is molded in the same manner as the foil, by homogeneously warming it to the melting temperature of its flowable components, so that it flows towards the relief mold together with the foil, and forms a strong background as soon as the foil has assumed the structure given by the relief form. Preferably, a textile layer embedded in polyvinylchloride is used as a supporting layer, whereby this carrier material is preferably linen soaked in a polyvinylchloride in order to provide a particularly faithful reproduction. In this case, the essentially homogeneous heating of the foil on the one hand and the polyvinylchloride layer on the other, the flow of the foil into the contours of the relief mold is achieved and supported by the subsequent additional flow of the polyvinylchoride.

Since it may be possible that, because of the heating and the rather rapid subsequent descent of the foil onto the relief mold, air might be trapped, it is advantageous to provide heating beginning in the center and slowly advancing to the edges.

As methods for the heating of the foil or the foil plus the additional supporting layer, respectively, the following are suggested: heating by means of a high-frequency field, heating by means of infra-red radiation, as well as heating by means of a contact heating method using an elastic couching element. When comparing it with the technique of prior art, which utilized excess pressures and partial vacuumes, there is no change inasmuch as the creation of a liquifying state within the foil or within the foil and its supporting layer together, respectively, the molding according to the relief is not impeded since the foil as well as the probably superimposed supporting layer are not directly subjected to any pressure and thus may be "uninfluenced" in assuming the form corresponding to the relief mold.

The essentially homogeneous warming of the foil or of the foil together with its supporting layer may be achieved by heating it by high-frequency energy in a high-frequency field by the dielectric method, by infrared radiation selected with particularly suitable wave lengths or by contact-heating whereby a couching with sufficiently high thermal conductivity provides a sudden warming of the foil or of the foil and the additional supporting layer.

Even though the originals in question—and thus the relief molds taken from them—have sufficiently rough surfaces in order to permit the air to escape sideways from under the melting foil, it is advantageous to provide for heating which starts in the center and proceeds towards the edges.

In a preferred process of this invention the relief mold used is at least at its molded surfaces galvanically coated with metal. This guarantees high mold stability even with high numbers of reproductions. In addition, the surface metal coating provides effective and quick heat dissipation for the incoming melting foil so that the foil quickly assumes the proper final shape and, because of the quenching effect, can easily be removed from the relief mold. Depending on the existing surface character, the relief mold may be provided with holes, if desired, or, also in the case of galvanic metal coatings, be given a porous design.

In order to avoid undue effect of the heat on the colors used for printing the foil, this foil preferably is put onto the relief mold with its printed side down. In this manner, the color coat is quickly cooled by the relief mold, as soon as it comes in contact therewith. It would be advantageous if additional cooling can be provided for the relief mold.

BRIEF DESCRIPTION OF THE DRAWINGS

Various other objects, features and attendant advantages of the present invention will be fully appreciated as the same becomes better understood by reference to the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
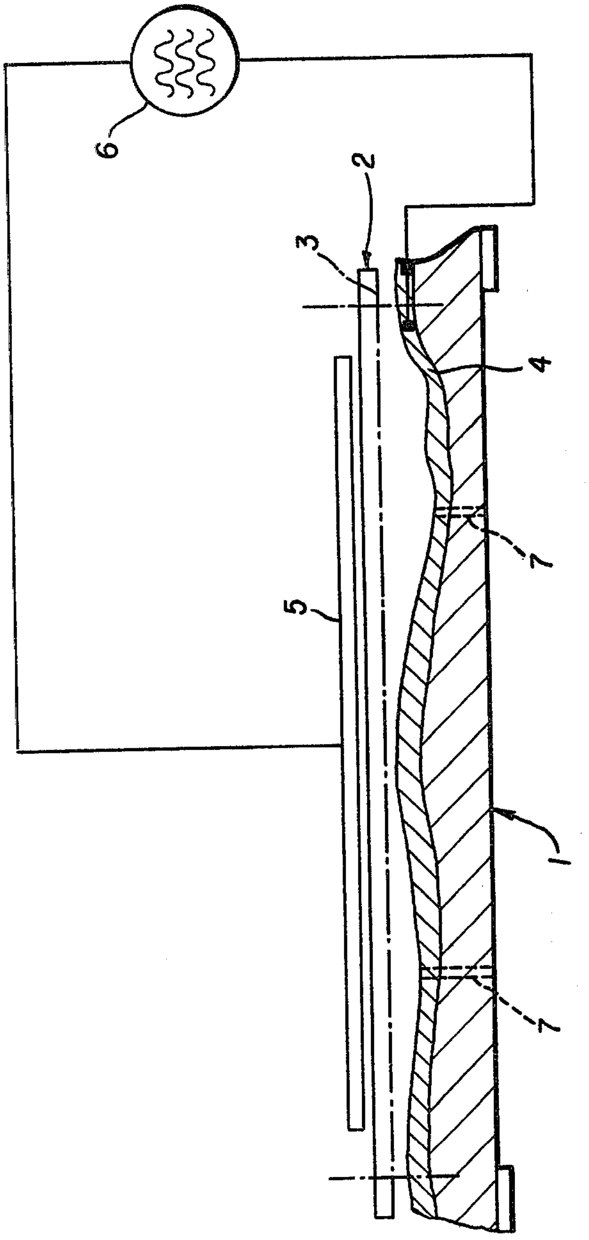
FIG. 1 shows an embodiment for the process of molding of the foil alone in accordance with the present invention.

According to FIG. 1, a thermoplastic foil 2, imprinted with the color picture corresponding to the original is superimposed upon a relief mold 1, being a negative shape of the surface structure of an oil painting or the like, with the picture surface 3 facing downward. The manufacture of the relief mold is accomplished in accordance with methods of record. As an example, a negative-impression may be made of the original oil painting, using a polyester resin. This method may cause minor damage, so that the artist may have to give his consent and may have to make repairs at the original painting. If such involves a valuable original of an old master, this impression method can obviously not be utilized. In this case, an extremely accurate copy must be used which necessarily will be expensive, but the cost would be distributed to a great number of reproductions and therefore not be weighty. Another solution in such a case would consist of the use of a laser beam running across the original and photochemically transferring it to a gelatine-mat or a similar object. The latter would have to be made into a hard mat by remolding and then producing an impression. A metal coat 4 is then galvanically applied to the mold surface of the polyester mat created in this manner.

An advantageous manufacturing process of the relief mold 1 consists in the so-called "cold process" whereby the original is copied in silicon caoutchouc. With this method, damage to the original is impossible and very valuable paintings may be copied in this manner. The silicon caoutchouc impression after suitable stiffening with a rigid plate and, if required, coating it with a metal coating 4, is then used as the relief mold 1.

The printing of foil 2 at the picture side 3 is done, for instance, in the offset-process, using a color picture of the painting with extremely precise color values without light reflections, made into perfectly true offset films in four colors. Naturally, extreme accuracy is of overall importance. During the production of the offset films as well as during the manufacture of the relief mold, first markings outside of the viewing angle may be provided which will later on facilitate the alignment of the printed foil 2 with the relief mold 1.

For the execution of the process, the metallized layer 4 on the one hand, and an electrode 5 arranged above the printed foil 2, are connected to a high-frequency generator 6. A shortterm activation of the high-frequency generator 6 causes the foil to be dielectrically heated to its liquefying temperature and to deform in less than one second, entering the negative molding surface of the relief form 1. The metallized layer 4 thereby serves as electrode on the one hand, and as heat dissipating layer on the other, which causes the picture surface 3 of the foil to harden in a very short time, thus guaranteeing quick and precise shaping of the foil 2.

In case the normal roughness of the original painting and thus the forming surface for the relief mold 1 should be insufficient to guarantee escape of the trapped air from the recesses underneath the foil, microscopically small air channels may be provided within the relief plate 1, as indicated by reference numeral 7. Also, the relief mold 1 together with its metallized layer 4 may be microscopically porous, so that the air may escape over the entire surface of the foil 2. Depending on the individual situation, the electrode 5 may be shaped in such a manner as to provide an even, homogeneous heating of the foil 2 along its entire thickness and its entire dimensions. A suitable design of the electrode 5, however, may also provide for a slightly higher temperature in the center, or an earlier beginning of the temperature rise in the center of the foil, which could consist of dividing the electrode 5 and the provision of time intervals for the activation of the resulting partial electrodes.

The printed foil 2 which has been molded with this process furnishes an extremely exact copy of the original with its most delicate structure so that nearly smooth-looking surfaces of the painting technique of, for instance, the 19th century, may be reproduced with the accuracy of the original. The process is very economical, since the choice of thin foil results in a quick heating and quick cooling down. The galvanic metallization 4 applied to the relief mold 1 does not influence the exactness of the impression at all, which may be deduced, for instance, from the fact that such galvanizations are used for phonograph-record blanks.

The metallization 4 provides a longer life for the relief mold 1 without signs of wear and contributes to the quicker cooling of the printed foil which has melted into it. In this connection, the quick cooling of the printed surface 3 of the foil 2 is important because it reduces the danger of a falsification of the colors used in printing by their exposure to heat. In this manner, the process provides a simpler manufacture of the mold, a higher degree of accuracy and faster and more economical reproduction then the processes known in the art.

Figure 2:
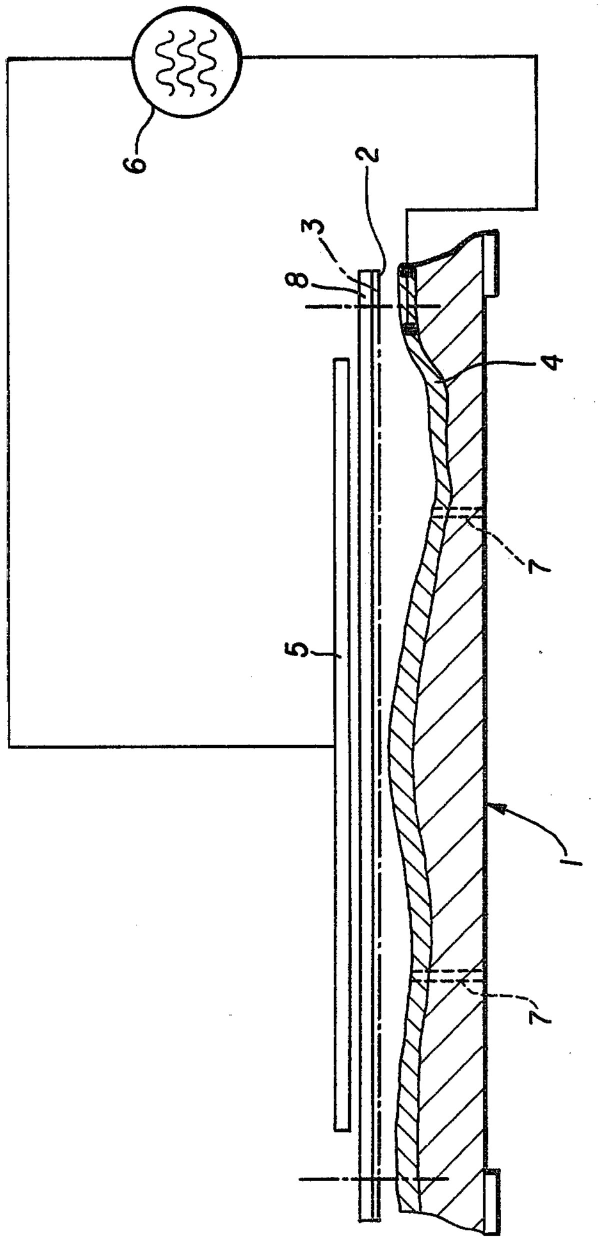
FIG. 2 shows an example of the process of the present invention of simultaneous molding the foil as well as the superimposition of supporting material.

A modification of the first embodiment of the present invention is shown in FIG. 2. In this process, a supporting layer 8 is placed on the foil 2 and, together with the foil 2 is subjected to dielectric high-frequency heating by means of the electrode 5 and the opposite electrode, which, in this case, consists of the metallization 4 of the relief mold. The electrode 5 may be placed on the supporting layer 8 which results in a particularly concentrated high-frequency heating into the direction of the relief mold 1 and its metal coating 4, respectively. As soon as the foil 2 and, if possible, simultaneously, the flowable component of the support layer 8, consisting of linen which has been soaked in PVC, for instance, have reached the liquefying temperature, the foil 2 and then the flowable component of the support layer 8 sinks into the structures of the relief mold 1 whereby a woven component of the supporting layer 8 remains essentially in its original shape.

The "flowing in" of the foil 2, which may take place under the weight of the material of the support layer 8 into the corresponding impressions of the relief mold 1 is caused primarily by the force of gravity which may be increased by the superimposed pressure of the electrode 5 on the original layering of the foil 2 and the support layer 8. The electrode 5 may, however, be designed completely independent from the layering of the foil 2 and the support layer 8 so that even if these two layers should touch it, they will detach from the electrode 5 as soon as they have reached the liquefyling temperature and will assume the desired shape.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the reproduction of oil paintings and the like, having a relief surface, using a relief mold taken from the original and a thermoplastic foil, imprinted with the color picture corresponding to the original, said foil being molded while being heated;

wherein said foil is placed with its imprinted side down on said relief mold in a fitting alignment, wherein a textile layer with a flowable component is placed over said foil, and wherein a supporting element of a heating device is placed over this layer arrangement, with the foil and the flowable component of said textile layer being then heated essentially homogeneously to liquefying temperature by means of said heating device, whereby the foil and the flowable component flow into the relief surface of said relief mold and are molded by their own weight and without the creation of a relative vacuum on one side of said foil.

2. The process as claimed in claim 1, wherein the textile comprises linen which has been saturated with polyvinyl chloride.

3. The process as claimed in claim 1 or 2, which further comprises pressing the support layer against the foil by its own weight and/or the additional pressure by means of a couching or pressure device.

4. The process as claimed in claims 1 or 2, which further comprises heating the foil, or the foil together with the support layer respectively beginning in the center of the relief mold and progressing towards the edges.

5. The process as claimed in claims 1 or 2, which further comprises dielectrically heating the foil, or the foil with the support layer, respectively, by means of an electric high-frequency field.

6. The process as claimed in claim 1, which further comprises heating the foil, or the foil with the support layer, respectively, by radiation with infra-red rays.

7. The process as claimed in claim 1, which further comprises heating the foil, or the foil with the support layer, respectively, by contact with a pre-heated elastic couching of high thermal capacity.

8. The process as claimed in claim 1, which further comprises galvanically metallizing the relief mold at least at its surface facing the foil.

9. The process as claimed in claim 1, wherein the relief mold is microscopically porous or provided with holes having microscopic dimensions.

10. The process as claimed in claim 1, which further comprises cooling the relief mold.

* * * * *